(12) United States Patent
Aoki et al.

(10) Patent No.: US 11,649,119 B2
(45) Date of Patent: May 16, 2023

(54) RAW MATERIAL SUPPLY DEVICE, DEVICE FOR PROCESSING ELECTRONIC AND ELECTRICAL DEVICE PART SCRAPS, AND METHOD FOR PROCESSING ELECTRONIC AND ELECTRICAL DEVICE PART SCRAPS

(71) Applicant: JX NIPPON MINING & METALS CORPORATION, Tokyo (JP)

(72) Inventors: Katsushi Aoki, Hitachi (JP); Yujiro Tokita, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 151 days.

(21) Appl. No.: 17/290,044

(22) PCT Filed: Oct. 30, 2019

(86) PCT No.: PCT/JP2019/042697
§ 371 (c)(1),
(2) Date: Apr. 29, 2021

(87) PCT Pub. No.: WO2020/090942
PCT Pub. Date: May 7, 2020

(65) Prior Publication Data
US 2021/0403247 A1  Dec. 30, 2021

(30) Foreign Application Priority Data
Oct. 31, 2018  (JP) .............................. JP2018-206162

(51) Int. Cl.
*B65G 47/19*  (2006.01)
*B65G 47/44*  (2006.01)
(Continued)

(52) U.S. Cl.
CPC ............ *B65G 47/44* (2013.01); *B65G 11/026* (2013.01); *B65G 11/206* (2013.01); *B65G 47/19* (2013.01); *B65G 2201/04* (2013.01)

(58) Field of Classification Search
CPC .... B65G 11/026; B65G 11/206; B65G 47/19; B65G 47/44
(Continued)

(56) References Cited

U.S. PATENT DOCUMENTS 4,031,004 A * 6/1977 Sommer, Jr. ............... B03C 1/23
                                                    209/636
4,183,192 A * 1/1980 Smaw ...................... B65B 19/34
                                                    53/151
(Continued)

FOREIGN PATENT DOCUMENTS

CN  102357468 A  2/2012
CN  205590014 U  9/2016
(Continued)

OTHER PUBLICATIONS

US 2022/0002095 A1, Sepulveda, Jan. 6 (Year: 2022).*
(Continued)

*Primary Examiner* — Douglas A Hess
(74) *Attorney, Agent, or Firm* — Birch, Stewart, Kolasch & Birch, LLP (57) ABSTRACT

A raw material supply device and a device for processing electronic and electrical device part scraps, which can control dropping positions of a raw material containing substances having different shapes and specific gravities, and a method for processing electronic and electrical device part scraps using those devices. The raw material supply device includes a receiving port, a discharge port, a first guide surface, and a second guide surface on a surface opposing to the first guide surface. The processing device includes a first (Continued)

conveying unit, a raw material supply device, a second conveying unit, and a pyramid-shaped disperser. The processing method comprises a sorting step, wherein the sorting step comprises dropping the electronic and electrical device part scraps onto a plurality of dispersion surfaces of a pyramid-shaped disperser, and dispersing the electronic and electrical device part scraps in a plurality of directions on a conveying surface.

11 Claims, 6 Drawing Sheets

(51) Int. Cl.
   *B65G 11/02*    (2006.01)
   *B65G 11/20*    (2006.01)
(58) Field of Classification Search
   USPC ...................................... 198/560; 193/14, 29
   See application file for complete search history.

(56) References Cited

U.S. PATENT DOCUMENTS

| | | | | |
|---|---|---|---|---|
| 4,377,230 | A * | 3/1983 | Burkner | B27N 3/14 198/569 |
| RE32,001 | E * | 10/1985 | Wahle | A24C 5/35 414/811 |
| 4,570,727 | A | 2/1986 | Ueda | |
| 4,978,000 | A | 12/1990 | Mohr | |
| 5,553,968 | A * | 9/1996 | Campbell | E01C 19/48 404/81 |
| 5,887,515 | A * | 3/1999 | Kunstmann | B27N 3/14 100/96 |
| 6,135,171 | A * | 10/2000 | Weakly | B65G 47/44 198/956 |
| 6,276,511 | B1 * | 8/2001 | Iredi | B27N 3/14 264/108 |
| 6,290,055 | B1 * | 9/2001 | Glorfield | B65G 47/44 198/550.01 |
| 7,228,956 | B2 * | 6/2007 | Pircon | B65G 11/126 198/560 |
| 9,422,072 | B2 * | 8/2016 | Kikuchi | B65B 5/06 |
| 10,099,525 | B1 * | 10/2018 | Phillips | B60D 1/143 |
| 2013/0306435 | A1 | 11/2013 | Kirkbride et al. | |

FOREIGN PATENT DOCUMENTS

| | | |
|---|---|---|
| EP | 0 182 584 A2 | 5/1986 |
| JP | 55-39953 U | 3/1980 |
| JP | 60-79125 U | 6/1985 |
| JP | 60-126440 U | 8/1985 |
| JP | 64-12020 U | 1/1989 |
| JP | 7-228319 A | 8/1995 |
| JP | 8-131953 A | 5/1996 |
| JP | 2009-240846 A | 10/2009 |
| JP | 2011-162271 A | 8/2011 |
| JP | 2012-12148 A | 1/2012 |
| KR | 10-0770300 B1 | 10/2007 |
| TW | M247566 U | 10/2004 |

OTHER PUBLICATIONS

International Preliminary Report on Patentability and English translation of the Written Opinioin of the International Searching Authority (forms PCT/IB/373, PCT/ISA/237 and PCT/IB/338), dated May 14, 2021, for corresponding International Application No. PCT/JP2019/042697.
Extended European Search Report for corresponding European Application No. 19878249.2, dated Jun. 24, 2022.
International Search Report issued in PCT/JP2019/042697 (PCT/ISA/210), dated Jan. 28, 2020.
Canadian Office Action and Search Report for corresponding Canadian Application No. 3118063, dated Aug. 19, 2022.
Taiwanese Office Action and Search Report for corresponding Taiwanese Application No. 110116370, dated Aug. 24, 2022, with English translation.
Korean Office Action for corresponding Korean Application No. 10-2021-7016178, dated Sep. 29, 2022.

* cited by examiner

RAW MATERIAL SUPPLY DEVICE, DEVICE FOR PROCESSING ELECTRONIC AND ELECTRICAL DEVICE PART SCRAPS, AND METHOD FOR PROCESSING ELECTRONIC AND ELECTRICAL DEVICE PART SCRAPS

FIELD OF THE INVENTION

The present invention relates to a raw material supply device, a device for processing electronic and electrical device part scraps, and a method for processing electronic and electrical device part scraps.

BACKGROUND OF THE INVENTION

Conveyors are known as conveying unit for conveying conveyance objects such as recycling raw materials. For example, Japanese Patent Application Publication No. 2009-240846 A (Patent Literature 1) discloses that raw materials such as aluminum cans are conveyed to a crusher, a hopper, a shredder, a magnetic sorter, a non-ferrous metal sorter, or the like, using a plurality of conveyors.

The raw material discharged from an end of the conveyor to its front has vectors in two directions (a traveling direction and a vertical direction) and is dropped while spreading. It may be difficult to control the dropping position to a certain range. In particular, when a raw material containing various part scraps having different shapes and specific gravities such as electronic and electrical device part scraps is conveyed to a raw material processing device by using a conveying unit such as a conveyor, it may be difficult to control the dropping position because the falling trajectory is changed depending on differences of shapes and specific gravities of the part scraps contained in the raw materials and aggregation degrees of the part scraps.

CITATION LIST

Patent Literatures

[Patent Literature 1] Japanese Patent Application Publication No. 2009-240846 A

SUMMARY OF THE INVENTION

Technical Problem

The present disclosure provides a raw material supply device and a device for processing electronic and electrical device part scraps, which can control dropping positions of a raw material containing substances having different shapes and specific gravities, as well as a method for processing electronic and electrical device part scraps using those devices.

Solution to Problem

In an aspect, an embodiment according to the present invention provides a raw material supply device, comprising an accommodating portion which accommodates a raw material dropped from a conveying unit for conveying the raw material toward a front of the conveying unit and which feeds the raw material to a predetermined position, the raw material containing substances having different shapes and specific gravities, wherein the raw material supply device comprises: a receiving port having a first opening for receiving the raw material on a top surface of the accommodation portion; a discharge port having a second opening for discharging the raw material on a bottom surface of the accommodating portion, the second opening having a cross-sectional area lower than that of the first opening; a first guide surface in a front of a side surface of the accommodating portion, the first guide surface passing through the discharge port from the receiving port to extend in a vertical direction so as to be contacted with the raw material dropped toward the front of the conveying unit to guide the raw material downward; and a second guide surface on a surface opposing to the first guide surface, of the side surface of the accommodating portion, the second guide surface being provided with an inclined surface that is continuous with the discharge port and is inclined with respect to a horizontal plane, and wherein the first guide surface extends such that a lowermost end portion of the first guide surface is located below an intersection of an extension line extending in an inclination direction of the second guide surface with the first guide surface.

In another aspect, the raw material supply device according to an embodiment of the present invention provides a raw material supply device, comprising: a first conveying unit for conveying a raw material containing substances having different shapes and specific gravities; a second conveying unit for conveying the raw material to a processing device for processing the raw material, the second conveying unit being provided below the first conveying unit; and a pyramid-shaped disperser having a raw material dropping region for receiving the raw material fed from the first conveying unit, the raw material dropping region being arranged on a conveying surface of the second conveying unit, the disperser being provided with a plurality of dispersion surfaces for dispersing the raw material dropped in the raw material dropping region in a plurality of directions on the conveying surface of the second conveying unit.

In an aspect, the device for processing electronic and electrical device part scraps according to an embodiment of the present invention provide a device for processing electronic and electrical device part scraps, comprising: a first conveying unit for conveying a raw material containing substances having different shapes and specific gravities; the raw material supply device according to claim 1 or 2 for supplying the raw material charged from the first conveying unit to its front to a predetermined position; a second conveying unit for conveying the raw material to a processing device for processing the raw material, the second conveying unit being provided below the raw material supply device; and a pyramid-shaped disperser arranged on a conveying surface of the second conveying unit, the disperser being provided with a plurality of dispersion surfaces for dispersing the raw material supplied from the raw material supply device in a plurality of directions on the conveying surface of the second conveying unit.

In an aspect, the method for processing electronic and electrical device part scraps according to an embodiment of the present invention provides a method for processing electronic and electrical device part scraps, comprising a sorting step for sorting electronic and electrical device part scraps using a sorter, wherein the sorting step comprises dropping the electronic and electrical device part scraps onto a plurality of dispersion surfaces of a pyramid-shaped disperser, and dispersing the electronic and electrical device part scraps in a plurality of directions on a conveying surface for conveying the electronic and electrical device part scraps to the sorter.

Advantageous Effects of Invention

According to the present disclosure, it is possible to provide a raw material supply device, a device for processing electronic and electrical equipment part scraps, and a method for processing electronic and electrical device part scraps using these, which can control a dropping position of a raw material containing substances having different shapes and specific gravities.

BRIEF DESCRIPTION OF THE DRAWINGS

FIG. 1 is: (a) a side view illustrating a raw material charging device according to an embodiment of the present invention, and (b) a plan view for explaining a dimension of a second opening of a discharge port of the raw material charging device;

DETAILED DESCRIPTION OF THE INVENTION

Hereinafter, embodiments of the present invention will be described with reference to the drawings. In descriptions of the drawings below, the same or similar portions are designated by the same or similar reference numerals. It should be noted that embodiments shown below illustrate devices and methods for embodying the technical idea of the present invention, and the technical idea of the present invention is not intended to limit structures, arrangements, etc. of components to those described below.

(Raw Material Supply Device)

Figure 1:
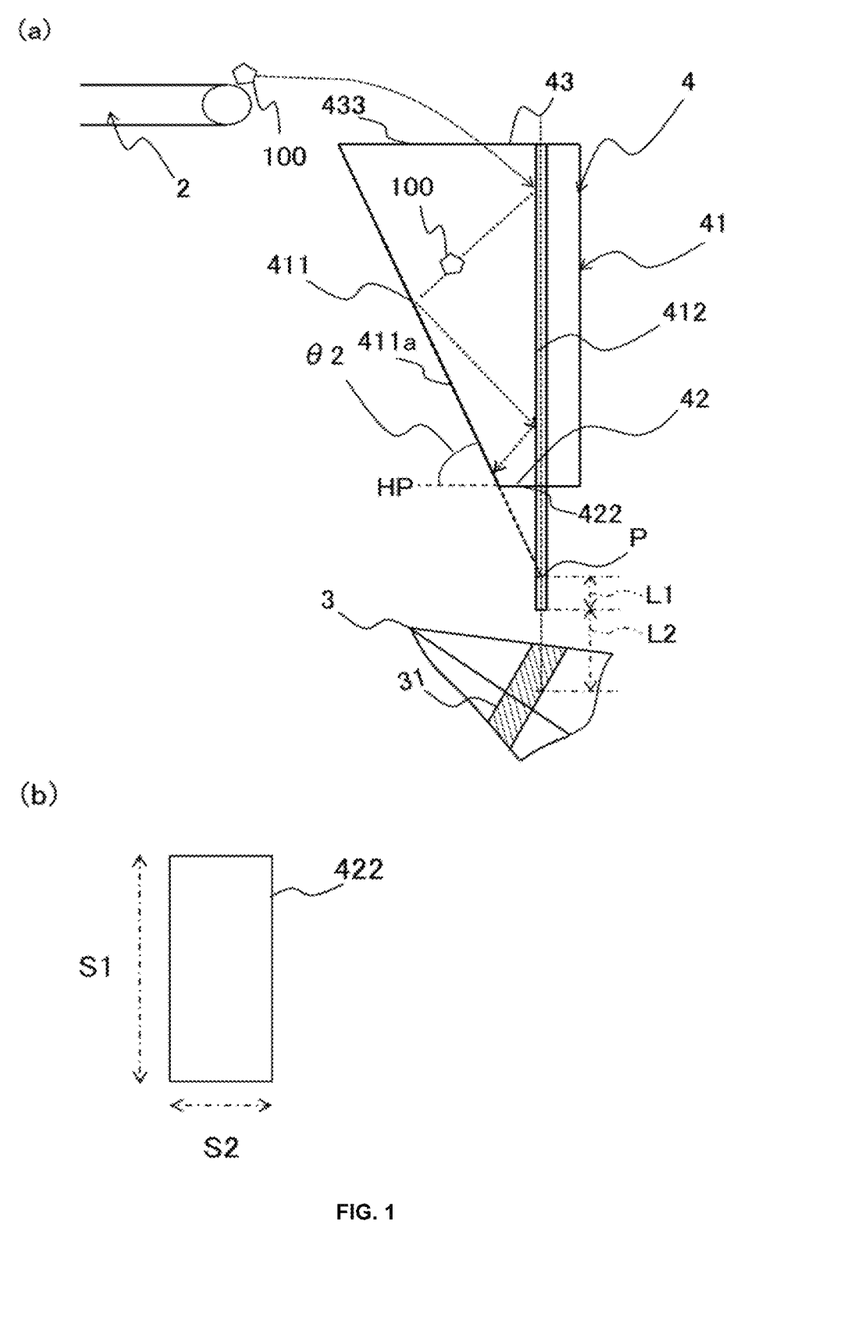

As shown in FIG. 1, a raw material supply device (raw material chute) 4 according to an embodiment of the present invention includes an accommodating portion 41 for accommodating a raw material 100 containing substances having different shapes and specific gravities, which is charged from a conveying unit (first conveying unit 2) for conveying the raw material 100 toward the front of the first conveying unit 2, the accommodating portion 41 feeding the raw material 100 to a predetermined position. The accommodating portion 41 includes a top surface; a bottom surface opposing to the top surface; and a side surface connected to the top surface and the bottom surface.

The raw material supply device 4 includes: a receiving port 43 having a first opening 433 for receiving the raw material 100 on the top surface of the accommodating portion 41; and a discharge port 41 having a second opening 422 for discharging the raw material 100 on the bottom surface of the accommodating portion 41. The second opening 422 has a lower cross-sectional area than that of the first opening 433.

The front of the side surface of the accommodating portion 41, i.e., the side surface of the accommodating portion 41 on the front side of the first conveying unit 2 for discharging the raw material 100 forward, is provided with a first guide surface 412 vertically extending from the receiving port 43 through the discharge port 42 so as to be contacted with the raw material 100 charged toward the front side of the first conveying unit 2 to guide the raw material 100 downward.

The first guide surface 412 may be made of a material selected so as to have a strength enough to prevent deformation even if the material is brought into contact with electronic and electrical device part scraps and the like. For example, the first guide surface 412 can be formed of an elastic body such as a rubber, a metal, and a plastic. A coating or the like for promoting the dropping of the raw material 100 may be applied on the surface of the first guide surface 412. Further, the first guide surface 412 may be the same as the side surface on the front side of the accommodating portion 41. The surface of the side surface of the accommodating portion 41 facing the first guide surface 412, i.e., the rear side of the side surface of the accommodating portion 41, is provided with a second guide surface 411 having an inclined surface 411a that is continuous with the discharge port 42 and is inclined with respect to a horizontal plane (HP).

The raw material 100 released from the first conveying unit 2 is dropped in the vertical direction while moving at least in the horizontal direction due to the conveyance by the first conveying unit 2. In this case, various raw materials 100 are charged into the receiving port 43 of the raw material supply device 4 while describing different falling loci (parabolas) depending on influences of the shapes and specific gravities of the raw material 100 and a degree of aggregation of the raw material 100, and the like.

When falling from the first conveying unit 2, a part of the raw material 100, which is repelled from the first conveying unit 2 or the other raw material 100 and released to the front side, is contacted with the surface of the first guide surface 412 and is guided to the lower part of the accommodating portion 41. A part of the raw material 100 is then contacted with the surface of the second guide surface 411, which is the inclined surface 411a, and is further guided downward. The raw material 100 thus proceeds downward between the first guide surface 412 and the second guide surface 411, and is dropped in the vertical direction from the second opening 422 of the discharge port 42.

As shown in FIG. 1 (b), the second opening 422 of the discharge port 42 has a rectangular shape, and it has: a first dimension S1 equal to or less than an effective width of the conveying surface of the first conveying unit 2 in a first direction that is parallel to an effective width direction (a depth direction of the paper surface in FIG. 1 (a)) of the conveying surface of the first conveying unit 2 as shown in FIG. 1 (a); and a second dimension S2 in a second direction that is orthogonal to the first direction. For example, when the effective width of the first conveying unit 2 is 600 mm, the first dimension S1 is set to be, for example, 600 mm or less, although not limited thereto.

The second dimension S2 is preferably such that clogging does not occur even if the raw material 100 is stored in the accommodating portion 41, and the second dimension S2 is from 0.5 to 10 times, preferably from 1 to 5 times the maximum diameter of the raw material 100. The shape of the second opening 422 is not limited to a rectangle, and it may be an ellipse or a shape in which corners of the rectangle are rounded, although not limited to the specific shapes.

As shown in FIG. 1 (a), the first guide surface 412 extending in the vertical direction in the accommodating portion 41 extends such that the lowermost end portion of the first guide surface 412 is located below an intersection P of an extended line extending along the inclination direction of the second guide surface 411 with the first guide surface 412. By arranging the first guide surface 412 so as to extend in the vertical direction, the raw material 100 is easily brought into contact with the first guide surface 412 to guide the raw material 100 in the vertical direction.

If the second guide surface 411 is also extended from the discharge port 42, the discharge port 42 is narrower and the raw material 100 may be easily clogged. Therefore, only the first guide surface 412 is preferably extended without extending the second guide surface 411.

An inclination angle θ2 of the inclined surface 411a of the second guide surface 411 relative to the horizontal plane HP can be appropriately changed depending on the raw material to be processed. When processing electronic and electrical device part scraps, the inclination angle θ2 is preferably 45 to 85°, and more preferably 50 to 80°. The adjustment of the inclination angle θ2 can prevent the raw material 100 from being contacted with the first guide surface 412 to bounce off and deviate from the dropping range, thereby allowing the raw material 100 to be concentrated to the target position to drop it in the vertical direction more reliably.

(Processing Device)

Figure 2:
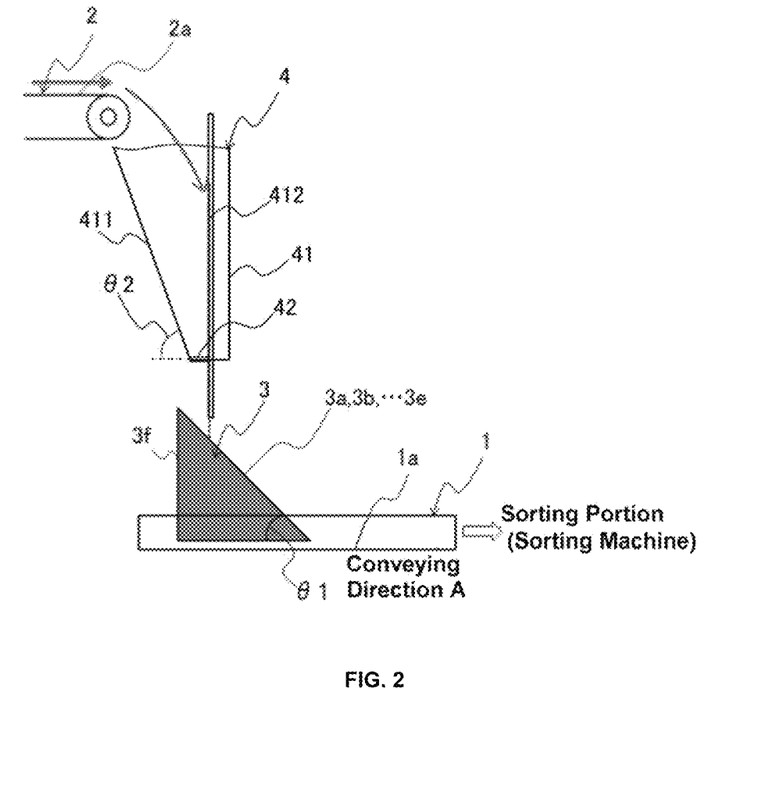
FIG. 2 is a side view illustrating a device for processing electronic and electrical device part scraps according to an embodiment of the present invention.

As shown in FIG. 2, the raw material supply device 4 shown in FIG. 1 can be suitably used for various processing devices to feed the raw material from the conveying surface 2a of the first conveying unit 2 comprised of a conveyor or the like to the first conveying surface 1a of the second conveying unit 1 located below the first conveying unit 2. The embodiment of FIG. 2 illustrates an example applied to the device for processing electronic and electrical devise part scraps containing various substances having different shapes and specific gravities.

That is, the device for processing the electronic and electrical device part scraps according to the embodiment of the present invention can include: the first conveying unit 2; the raw material supply device 4 for supplying the raw material charged to the front of the first conveying unit 2 to a predetermined position; a second conveying unit 1 for conveying the raw material, the second conveying unit 1 being provided below the raw material supply device 4; and a pyramid-shaped disperser 3 having a plurality of dispersion surfaces 3a, 3b, 3c, 3d, 3e for dispersing the raw material supplied from the raw material supply device 4 in a plurality of directions on the conveying surface 1a of the second conveying unit 1, the pyramid-shaped disperser 3 being arranged on the second conveying unit 1.

Figure 3:
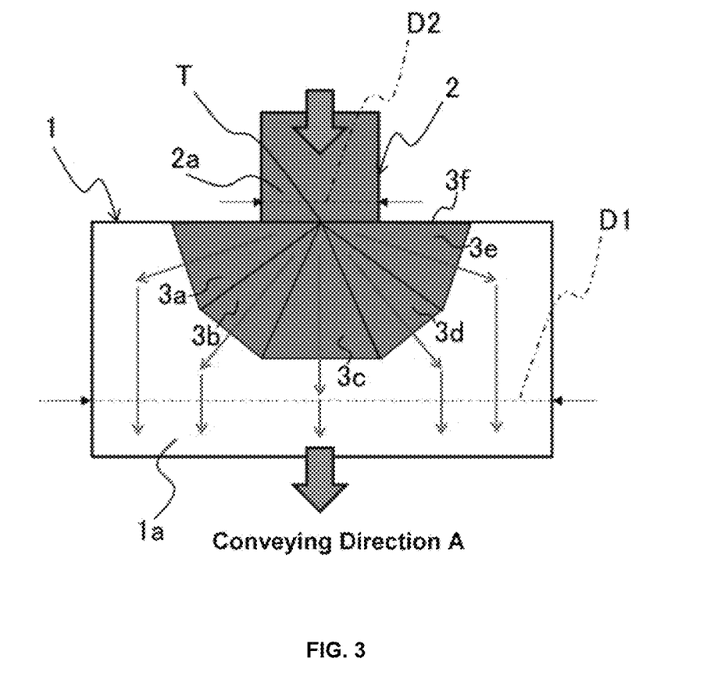
FIG. 3 is a partially enlarged plan view of the device for processing electronic and electrical device part scraps in FIG. 2.

The second conveying means 1 may suitably employ a conveyor or the like for conveying the raw material to a sorting portion (sorting machine) for physically sorting the raw material. As shown in FIG. 3, the second conveying unit 1 has a first width D1 in a direction orthogonal to a conveying direction A of the raw material. The first conveying unit 2 has a second width D2 narrower than the first width D1 in a direction orthogonal to the conveying direction of the raw material.

If the second width D2 is too small and the first width D1 is too large, it may be difficult to disperse the raw material over the entire conveying surface 1a from the first conveying unit 2 to the second conveying means 1. On the other hand, if the second width D2 is larger and the first width D1 is smaller, the raw material may protrude from the conveying surface 1a and fall on the outside of the conveying surface 1a. Therefore, it is preferable that each width is adjusted such that the first width D1 is from 2 to 5 times the second width D2, and more preferably, the first width D1 is from 2 to 3 times the second width D2.

Figure 4:
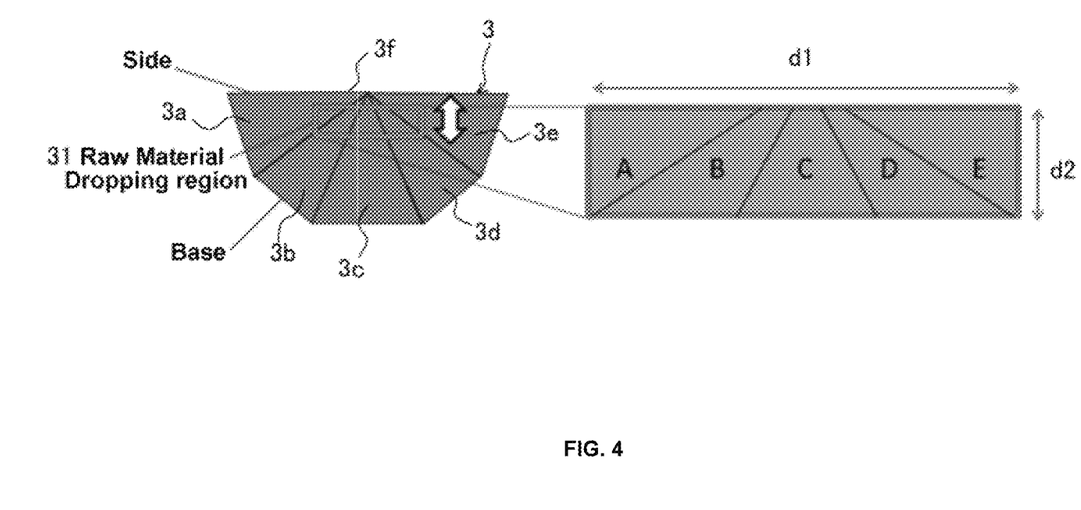
FIG. 4 is an explanatory view illustrating a raw material dropping region defined in a disperser.

As shown in FIG. 2, the disperser 3 is provided on the conveying surface 1a below the first conveying unit 2. As shown in FIG. 3, the disperser 3 includes a plurality of dispersion surfaces 3a, 3b, 3c, 3d, 3e for radially dispersing the dropped raw material in a plurality of directions. In the embodiment of FIG. 4, five dispersion surfaces 3a to 3e are provided, and each of the dispersion surfaces 3a to 3e has an isosceles triangle shape, although the shape and number are not limited thereto.

For example, it is sufficient to have two or more of the dispersion surfaces 3a to 3e, and an increased number of dispersion surfaces 3a to 3e can further improve dispersibility of the raw material. However, if there are too many dispersion surfaces, it may be difficult to be designed, and it may also be difficult to control a direction where the raw materials are dispersed. The number of the dispersion surfaces 3a to 3e may be from about 2 to 10, and more preferably from about 3 to 7, and further preferably from 3 to 5.

More preferably, the dispersion surfaces 3a to 3e are provided in an odd number. The disperser 3 is preferably arranged so as to be aligned on the conveying surface 1a such that one dispersion surface 3c of the dispersion surfaces 3a to 3e faces the conveying direction A of the conveying surface 1a. Such an arrangement can allow an increased amount of raw material to be fed to the front side (conveying direction) of the disperser 3 while dispersing the raw material in the width direction.

The disperser 3 is provided with the plurality of dispersion surfaces 3a to 3e in the conveying direction of the raw material, and the rear side in the conveying direction, i.e., a rear surface portion 3f opposing to the plurality of dispersion surfaces 3a to 3e is a single surface extending perpendicularly to the conveying surface 1a, as shown in FIG. 3. The rear surface portion 3f has a shape of an isosceles triangle that shares sides of the dispersion surface 3a and the dispersion surface 3e. That is, the disperser 3 has a pyramid shape with a hexagonal bottom surface, which has five dispersion surfaces 3a to 3e radially extending from an apex T (see FIG. 3) at the uppermost portion in the supplying direction of the raw material, and the rear surface portion 3f extending from the apex T vertically to the conveying surface 1a.

As shown in FIG. 2, each of the dispersion surfaces 3a to 3e is preferably an inclined surface that is inclined at an inclination angle θ1 with respect to the conveying surface 1a. Along the inclined surface, the raw material dropped from the first conveying unit 2 are fed from the upper side to the lower side of the disperser 3, so that the raw material can be dispersed in a plurality of directions on the conveying surface 1a as shown in FIG. 3.

If the inclination angle θ1 formed by the conveying surface 1a and each of the dispersed surfaces 3a to 3e is too small, the raw material may not be properly conveyed to the conveying surface 1a, which may cause clogging of the raw material. On the other hand, if the inclination angle θ1 formed by the conveying surface 1a and each of the dispersed surfaces 3a to 3e is too large, the raw material may rapidly fall onto the conveying surface 1a to damage the conveying surface 1a. The inclination angle θ1 formed by the conveying surface 1a and each of the dispersion surfaces 3a to 3e is preferably from 30 to 70°, and more preferably from 35 to 50°.

As shown in FIG. 4, the disperser 3 defines a raw material dropping region 31 for receiving the raw material dropped from the raw material supply device 4 directly below the discharge port 42 of the raw material in the raw material supply device 4. The raw material dropping region 31 is defined at a position directly below the discharge port 42 of the raw material supply device 4 when the disperser 3 is viewed from the upper surface thereof. The raw material dropping region 31 has a rectangular shape as with the discharge port 42, has a width d2 in the conveying direction, and has a width d1 in the direction orthogonal to the conveying direction. The raw material dropping region 31 is set such that the width d2 of the raw material dropping region 31 in the conveying direction is the same as or slightly narrower than the second dimension S2 of the discharge port 42 of the raw material supply device 4. By arranging the raw material dropping region 31 so as to drop selectively the raw material from the discharge port 42 of the raw material supply device 4 into the raw material dropping region 31, the dispersion direction of the raw material by the disperser 3 can be controlled. If the width d2 of the raw material dropping region 31 in the conveying direction is wider than the size of the discharge port 42 of the raw material supply device 4, the dispersibility may be deteriorated.

Further, it is preferable that the shape of the disperser 3 is adjusted such that the area ratios of the plurality of dispersion surfaces 3a to 3e in the raw material dropping region 31 are equal to each other. By adjusting the shape of the disperser 3 such that the area ratios of the plurality of dispersion surfaces 3a to 3e in the raw material dropping region 31 are equal to each other, an amount of the raw material to be dropped on each of the dispersion surfaces 3a to 3e can be made uniform among the dispersion surfaces 3a to 3e, so that the raw materials can be more uniformly dispersed and supplied on the conveying surface 1a.

It is preferable that the disperser 3 having the raw material dropping region 31 and the raw material supply device 4 are arranged at an appropriate distance from each other. As shown in FIG. 1, a length L1 from the intersection P of the extended line extending in the inclination direction of the second guide surface 411 with the first guide surface 412 to the lowermost end portion of the first guide surface 412 can be adjusted to be about 0.5 to 1.5 times the maximum diameter of the raw material 100. A length L2 from the lowermost end portion of the first guide surface 412 to the disperser 3 can be adjusted to be about 1.0 to 1.5 times the length L1. When the electronic and electrical device part scraps are used as the raw material 100, the appropriate adjustment of the lengths L1 and L2 can lead to reliable dropping of the raw material 100 in the raw material dropping region 31. Typically, the disperser 3 and the raw material supply device 4 are arranged such that the length L2 from the lowermost end portion of the first guide surface 412 to the disperser 3 is at a distance of from 20 to 100 mm, and more preferably from 50 to 80 mm, thereby more reliably dropping the raw material 100 in the raw material dropping region 31 to enable the raw material 100 to be uniformly dispersed from the disperser 3.

According to the raw material supply device 4 and the device for processing the electronic and electrical device part scraps of the embodiment of the present invention, the raw material supply device 4 and the disperser 3 are arranged between the first conveying unit 2 and the second conveying unit 1, whereby the raw material containing substances having different shapes and specific gravities can be concentrated and dropped at the predetermined position, and the raw material can be more uniformly dispersed on the conveying surface 1a.

(Method for Processing Electronic and Electrical Device Part Scraps)

The raw material supply device 4 and the device for processing electronic and electrical device part scraps as shown in FIGS. 1 to 4 are suitably applied to a sorting step for sorting electronic and electrical device part scraps using various sorters such as wind power sorters, metal sorters, color sorters, and sieving machines.

As used herein, the "electronic and electrical device part scraps" in the present embodiment refers to scraps obtained by crushing electronic and electrical devices such as waste home electric appliances, PCs, and mobile phones, recovering them and then crushing them to have an appropriate size. In the present embodiment, the crushing for obtaining the electronic and electrical device part scraps may be performed by an operator. However, crushed objects may be purchased on the market.

The crushing method is carried out by any apparatus that is not limited to a specific apparatus, and may be carried out in sharing or shock manner. It is desirable to carry out crushing such that the shapes of the parts are maintained as much as possible. Therefore, the apparatus does not include one belonging to the category of a crusher for the purpose of fine crashing.

The electronic and electrical device part scraps can be classified into part scrap consisting of synthetic resins (plastics) used for substrates, parts such as ICs and connectors, and casings; wire scraps; metals; film-shaped part scraps; powders generated by crushing or pulverizing; and others, and they can be further classified into subclasses depending on purposes of the processing. In the present embodiment, the electronic and electrical device part scraps that have been crushed to have a maximum diameter of 100 mm or more, and more typically 50 mm or less, and have a percentage of individual parts separated as part scraps of 70% or more in weight ratio may preferably be processed, although not limited thereto.

By processing these various types of part scraps in a predetermined order, for example, when sorted materials are used in a copper smelting step, raw materials that have concentrated valuable metals including gold, silver, platinum, palladium, and copper can be obtained while reducing unwanted substances for the processing in the copper smelting step, for example, smelting inhibiting substances such as elements such as antimony (Sb) and nickel (Ni), resins, aluminum (Al), and iron (Fe) as much as possible.

The sorting step can include at least one of a wind force sorting step, a magnetic force sorting step, an eddy current sorting step, a specific gravity sorting step, and an optical sorting step of optically sorting a metallic substance and a non-metallic substance. The raw material supply device according to the embodiment of the present invention is arranged in front of the sorter used in each of these sorting steps.

For example, in the method for processing electronic and electrical device part scraps including a sorting step for sorting electronic and electrical device part scraps using the sorter, the electronic and electrical device part scraps are dropped via the raw material supply device 4 onto the dispersion surfaces 3a to 3e of the pyramid-shaped disperser 3 arranged on the conveying surface 1a to disperse the electronic and electrical device part scraps in the plurality of directions on the conveying surface 1a, in the method for supplying the electronic and electrical device part scraps onto the conveying surface 1a for conveying the electronic and electrical device part scraps to the sorter.

By using the disperser 3 in combination with the raw material supply device 4, the dispersibility of the electronic and electrical device part scraps on the conveying surface 1a can be further improved. That is, using the raw material supply device 4 provided directly above the disperser 3, the electronic and electrical device part scraps are dropped in the vertical direction from the discharge port of the raw material supply device 4, and the electronic and electrical device part scraps onto the raw material dropping region 31 defined on the disperser 3 formed such that the area ratios of the plurality of dispersion surfaces 3a to 3e are equal to each other, whereby the electronic and electrical device part scraps can be more evenly dispersed on the conveying surface 1a.

When the electronic and electrical device part scraps are supplied to the sorter, the method for processing electronic and electrical device part scraps according to the embodiment of the present invention can prevent the electronic and electrical devise part scraps in the form of non-dispersed aggregates from being charged into the sorter, so that malfunction or damage of the sorter can be prevented, and a decrease in a sorting efficiency of the sorter can also be suppressed.

As described above, the present disclosure is not limited to the present embodiments, and the components may be modified and embodied without departing from the spirit of the present invention. Further, various inventions may be formed by appropriately combining a plurality of components disclosed in the present embodiments. For example, some components may be deleted from all the components shown in the present embodiments, or the respective components may be combined as appropriate.

For example, although the present embodiment illustrates an example in which the raw material is supplied onto the disperser 3 via the raw material supply device 4, the raw material supply device 4 may be omitted. When the raw material supply device 4 is omitted, an excessively high height from the conveying surface 1a to the conveying surface 2a of the first conveying unit 2 may cause the raw material to be processed to fall from the conveying surface 1a, or, cause, for example, angular electronic and electric device part scraps to hit on the conveying surface 1a to damage the conveying surface 1a. On the other hand, an excessively low height from the conveying surface 1a to the conveying surface 2a of the first conveying unit 2 may cause the raw material to be processed to be concentrated on the conveying surface 1a without being well dispersed. The height of the conveying surface 2a of the first conveying unit 2 with respect to the conveying surface 1a is preferably from 1.0 to 2.0 m, and typically from 1.2 to 1.6 m.

EXAMPLES

Examples of the present invention will be illustrated below. However, these Examples are provided for better understanding of the present embodiment and its advantages, and they are not intended to limit the invention.

(Design of Raw Material Supply Device)

The raw material supply device 4 as shown in FIG. 1 was manufactured in order to concentrate and drop the raw material in a specific range in the vertical direction. It is assumed that an effective width of a conveying surface of a conveyor above the raw material supply device 4 is 600 mm, the maximum diameter of the raw material is from 50 to 70 mm, and a conveying speed of the raw material is 36 m/min. Used as the raw material were electronic and electrical device part scraps comprised of substrates, parts such as ICs and connectors, synthetic resins (plastics) used for housings, wire scraps, metals, film-shaped part scraps, powders generated by breaking and crushing, and other materials, and aluminum plates (20 mm×50 mm×0.5 mm). The size of the first opening 433 of the receiving port 43 was designed to be 600 mm×320 mm. The first dimension S1 of the second opening 422 of the discharge port 42 was designed to be 600 mm, and the second dimension was designed to be 50 mm. The length L1 from the intersection P of the extended line extending in the inclination direction of the second guide surface 411 with the first guide surface 412 to the lowermost end portion of the first guide surface 412 was 50 mm, and the length L2 from the lowermost end portion of the guide surface 412 to the disperser 3 was 70 mm, and the arrangement position was adjusted such that the raw material dropping region 31 of the disperser 3 was directly below the second opening 422 of the discharge port 42. In addition, the inclination angle $\theta2$ of the inclined surface 411a of the second guide surface 411 was 70°.

(Design of Disperser)

The disperser with different numbers of dispersion surfaces were manufactured and a dispersion behavior of the raw material was evaluated. The disperser was made of a plastic corrugated cardboard and had from 2 to 5 dispersion surfaces. Each dispersion surface was in the form of an isosceles triangle, in which the bases of the respective triangles were equal to each other. The inclination angle of each dispersion surface with respect to the bottom surface of the disperser was designed to be 45°. As a raw material to be processed, an aluminum plate (20×50×0.5 mm) was used for easy evaluation. The results are shown in FIG. 5.

Figure 5:
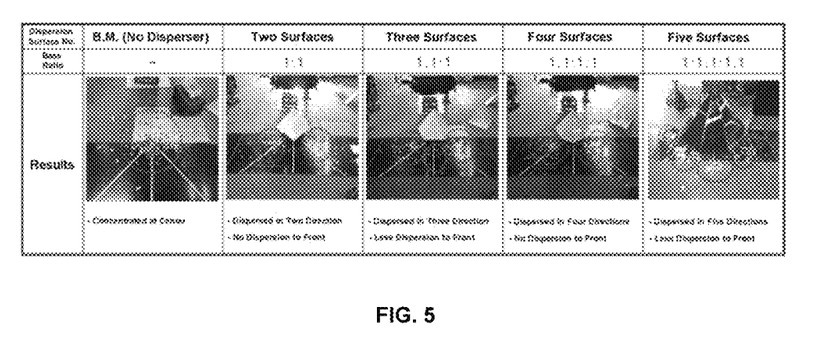
FIG. 5 is a photograph showing a dispersed state of a raw material to be processed, when the number of dispersed surfaces of a disperser is changed from 0 to 5.

As shown in FIG. 5, it was found that the increased number of dispersed surfaces resulted in better dispersibility of the raw material to be processed. The number of dispersed surfaces of three or five, an odd number, can allow the raw material to be processed to be dispersed forward as compared with the case where the number of dispersed surfaces is an even number.

Figure 6:
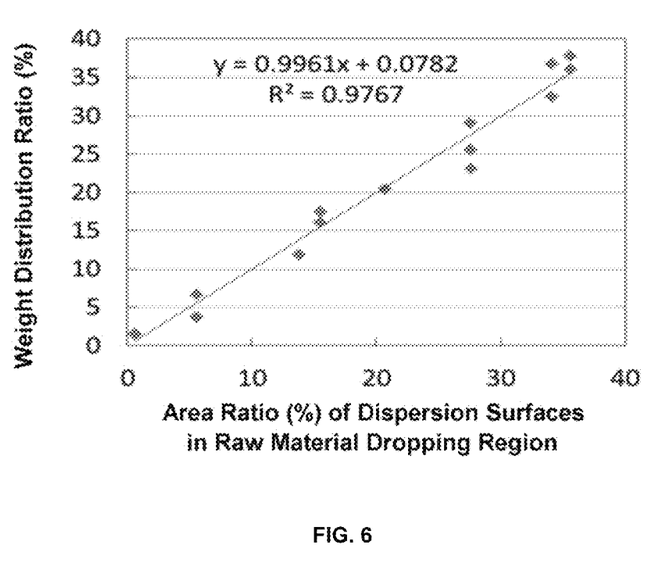
FIG. 6 is a graph showing a relationship between an area ratio of a dispersed surface of a raw material dropping region and a weight distribution ratio of a raw material to be processed.

Various dispersers were manufactured, the relationship between the area ratio of each dispersion surface in the raw material dropping region and the weight distribution ratio was investigated by changing the discharged position of the discharge port from the raw material chute. As a result, it was found that the area ratio of each dispersed surface in the raw material dropping region and the weight distribution ratio were substantially proportional to each other (FIG. 6).

Further, as shown in FIG. 4, the sorting test was conducted for a case where the areas (A to E) of the dispersion surfaces in the raw material dropping region of the disperser having five dispersion surfaces were equal and a case where the bases of the dispersion surfaces of the disperser were equal (see Table 1).

TABLE 1

|  |  | A | B | C | D | E |
|---|---|---|---|---|---|---|
| (a) Case of | Base Ratio | 1.0 | 1.0 | 1.0 | 1.0 | 1.0 |
| Equal Base Ratio | Area Ratio (%) | 21 | 22 | 14 | 22 | 21 |
| (b) Case of | Base Ratio | 1.0 | 0.9 | 1.4 | 0.9 | 1.0 |
| Equal Area Ratio | Area Ratio (%) | 20 | 20 | 20 | 20 | 20 |

It was found that although the raw material to be processed could not be more uniformly dispersed by making the bases of the dispersion surfaces equal, the uniform dispersion of the raw material to be processed could be further improved by setting the raw material dropping region and the disperser such that the areas (A to E) of the dispersion surfaces were equal.

(Dropping Test)

In the processing device as shown in FIG. 1, the electronic and electrical device part scraps and aluminum pieces as raw materials were dropped from the first conveying unit at a conveying speed of 36 m/min toward the raw material supply device 4 to disperse the raw materials from the disperser 3 on the conveying surface 1a on the second conveying unit 1. The weights of the raw materials dropped onto the conveying surface 1a along the dispersion surfaces 3a to 3e (A to E in FIG. 4) of the disperser 3 were determined. The results are shown in Table 2.

TABLE 2

|  | Aluminum Plate | | | | | | Electronic And Electrical Device Part Scraps | | | | | |
| --- | --- | --- | --- | --- | --- | --- | --- | --- | --- | --- | --- | --- |
|  | A | B | C | D | E | Ave. | A | B | C | D | E | Ave. |
| Weight (g) | 173 | 182 | 192 | 180 | 171 | 180 | 171 | 182 | 184 | 197 | 166 | 180 |
| Distribution Ratio (%) | 19.3 | 20.3 | 21.4 | 20 | 19.1 | 20 | 19 | 20.2 | 20.4 | 21.9 | 18.4 | 20 |
| Error (%) | −3.6 | 1.4 | 6.9 | 0.1 | −4.7 |  | −5.0 | 1.1 | 2.2 | 9.4 | −7.8 |  |

In Table 2, the distribution ratio (%) represents a ratio of the weight of the raw material dispersed on each dispersion surface to the total weight of the raw material. The error (%) represents an error with respect to an ideal value when the entire raw material is evenly dispersed on each dispersion surface.

As shown in Table 2, it is found that in both cases where the aluminum plate and the electronic and electrical device part scraps are used, the error of the distribution ratio within 10% can be achieved, and the disperser and the raw material supply device according to the present embodiment can be used to achieve more uniform dispersion with respect to the conveying surface 1a.

DESCRIPTION OF REFERENCE NUMERALS 1 second conveying unit
1a conveying surface
2 first conveying unit
2a conveying surface
3 disperser
3a-3e dispersion surface
4 raw material supply device
31 raw material dropping region
41 accommodating portion
42 discharge port
43 receiving port
411 second guide surface
411a inclined surface
412 first guide surface
422 second opening
433 first opening

The invention claimed is:

1. A raw material supply device, comprising an accommodating portion which accommodates a raw material dropped from a conveying unit for conveying the raw material toward a front of the conveying unit and which feeds the raw material to a predetermined position, the raw material containing substances having different shapes and specific gravities, wherein the raw material supply device comprises:
a receiving port having a first opening for receiving the raw material on a top surface of the accommodation portion;
a discharge port, having a second opening for discharging the raw material on a bottom surface of the accommodating portion, the second opening having a cross-sectional area lower than that of the first opening;
a first guide surface in a. front of a side surface of the accommodating portion, the first guide surface extending in a vertical direction through the discharge port from the receiving port to so as to be contacted with the raw material dropped toward the front of the conveying unit to guide the raw material downward; and
a second guide surface on a surface opposing to the first guide surface, of the side surface of the accommodating portion, the second guide surface being provided with an inclined surface that is continuous with the discharge port and is inclined with respect to a horizontal plane, and
wherein the first guide surface extends such that a lowermost end portion of the first guide surface is located below an intersection of an extended line extending in an inclination direction of the second guide surface with the first guide surface.

2. The raw material supply device according to claim 1, wherein the raw material supply device has: a first dimension equal to or less than an effective width of a conveying surface of the conveying unit in a first direction that is parallel to an effective width direction of the conveying surface of the conveying unit; and a second dimension in a second direction that is orthogonal to the first direction, the second dimension being from 0.5 to 10 times a maximum diameter of the raw material.

3. A device for processing electronic and electrical device part scraps, comprising:
a first conveying unit for conveying a raw material containing substances having different shapes and specific gravities;
the raw material supply device according to claim 2 for supplying the raw material charged from the first conveying unit to its front to a predetermined position;
a second conveying unit for conveying the raw material to a processing device for processing the raw material, the second conveying unit being provided below the raw material supply device; and
a pyramid-shaped disperser arranged on a conveying surface of the second conveying unit, the disperser being provided with a plurality of dispersion surfaces for dispersing the raw material supplied from the raw material supply device in a plurality of directions on the conveying surface of the second conveying unit.

4. A device for processing electronic and electrical device part scraps, comprising:
a first conveying unit for conveying a raw material containing substances having different shapes and specific gravities;

the raw material supply device according to claim 1 for supplying the raw material charged from the first conveying unit to its front to a predetermined position;

a second conveying unit for conveying the raw material to a processing device for processing the raw material, the second conveying unit being provided below the raw material supply device; and a pyramid-shaped disperser arranged on a conveying surface of the second conveying unit, the disperser being provided with a plurality of dispersion surfaces for dispersing the raw material supplied from the raw material supply device in a plurality of directions on the conveying surface of the second conveying unit.

5. The device for processing electronic and electrical device part scraps according to claim 4, wherein the disperser has a raw material dropping region for receiving the raw material dropped from the raw material supply device, the disperser being provided below the discharge port of the raw material supply device, and wherein the disperser is arranged such that area ratios of the plurality of dispersion surfaces in the raw material dropping region are equal to each other.

6. The device for processing electronic and electrical device part scraps according to claim 4, wherein a lowermost end portion of the first guide surface and the disperser are arranged at a distance of from 20 to 100 mm.

7. A method for processing electronic and electrical device part scraps, comprising a sorting step for sorting electronic and electrical device part scraps using a sorter, wherein the sorting step comprises dropping the electronic and electrical device part scraps onto a plurality of dispersion surfaces of a pyramid-shaped disperser, and dispersing the electronic and electrical device part scraps in a. plurality of directions on a conveying surface for conveying the electronic and electrical device part scraps to the sorter, wherein the method comprises supplying the electronic and electrical device part scraps onto the dispenser via the raw material supply device according to claim 1.

8. A raw material supply device, comprising:

a first conveying unit for conveying a raw material containing substances having different shapes and specific gravities;

a second conveying unit for conveying the raw material to a processing device for processing the raw material, the second conveying unit being provided below the first conveying unit; and a pyramid-shaped disperser having a raw material dropping region having a plurality of surfaces for receiving the raw material fed from the first conveying unit, the disperser being arranged on a conveying surface of the second conveying unit, the disperser being provided with a plurality of dispersion surfaces for dispersing the raw material dropped in the raw material dropping region in a plurality of directions on the conveying surface of the second conveying unit, wherein ratios of the plurality of surfaces of the raw material dropping region are equal to each other.

9. The raw material supply device according to claim 8, wherein the disperser is provided in an odd number and the disperser is preferably arranged so as to be aligned on the conveying surface such that one of the dispersion surfaces faces the conveying direction.

10. The raw material supply device according to claim 8, wherein an inclination angle formed by the conveying surface and the dispersion surfaces is from 30 to 70°.

11. The raw material supply device according to claim 8, wherein a height of the conveying surface of the first conveying unit with respect to the conveying surface is from 1.0 to 2.0 m.

\* \* \* \* \*